United States Patent [19]

Faroudja

[11] Patent Number: 4,959,717
[45] Date of Patent: Sep. 25, 1990

[54] METHOD FOR MASKING PICTURE REINFORCEMENT SIGNALS CARRIED WITHIN THE VERTICAL INTERVAL

[76] Inventor: Yves C. Faroudja, 26595 Anacapa Dr., Los Altos, Calif. 94022

[21] Appl. No.: 454,369

[22] Filed: Dec. 21, 1989

Related U.S. Application Data

[63] Continuation-in-part of Ser. No. 350,940, May 12, 1989, abandoned.

[51] Int. Cl.$^5$ .............................................. H04N 7/087
[52] U.S. Cl. ..................................... 358/147; 358/12; 358/37; 358/141; 358/166
[58] Field of Search ...................... 358/11, 12, 37, 140, 358/141, 142, 147, 166

[56] References Cited

U.S. PATENT DOCUMENTS

| | | | |
|---|---|---|---|
| 4,551,754 | 11/1985 | Meise et al. ........................... | 358/180 |
| 4,556,906 | 12/1985 | Dischert et al. ...................... | 358/180 |
| 4,672,425 | 6/1987 | Marie et al. ............................ | 358/12 |
| 4,888,799 | 12/1989 | Mobley et al. .......................... | 380/6 |

FOREIGN PATENT DOCUMENTS 62-7984  4/1987  Japan .

Primary Examiner—John W. Shepperd
Assistant Examiner—Michael D. Parker
Attorney, Agent, or Firm—David B. Harrison

[57] ABSTRACT

A method generates a reinforcement signal for transmission in scan lines within a vertical blanking interval of a predetermined television video signal, and includes the steps of: randomizing the reinforcement signal in accordance with a predetermined key, adding the randomized signal to be within the vertical blanking interval of the video signal to produce a combined signal, and sending the combined signal through a television transmission path. In a preferred embodiment the video signal is in accordance with an aspect ratio which is greater than four to three, and the combined signal may be displayed on a conventional television display which displays an increased vertical blanking interval as horizontal dark bars at the top and bottom of the television picture and wherein the reinforcement signal within the bars is not coherent with any picture image being displayed. Within such displays, gamma correction of the reinforcement signal is useful. A method of extracting and processing the reinforcement signal and using it to enhance the quality of picture display in a predetermined fashion is also disclosed.

32 Claims, 9 Drawing Sheets

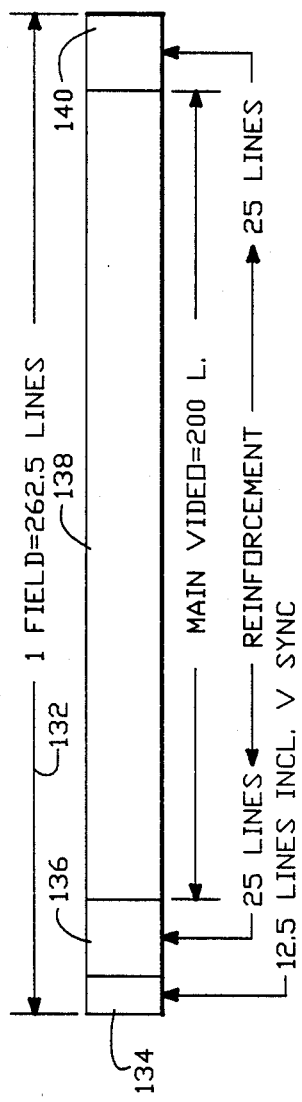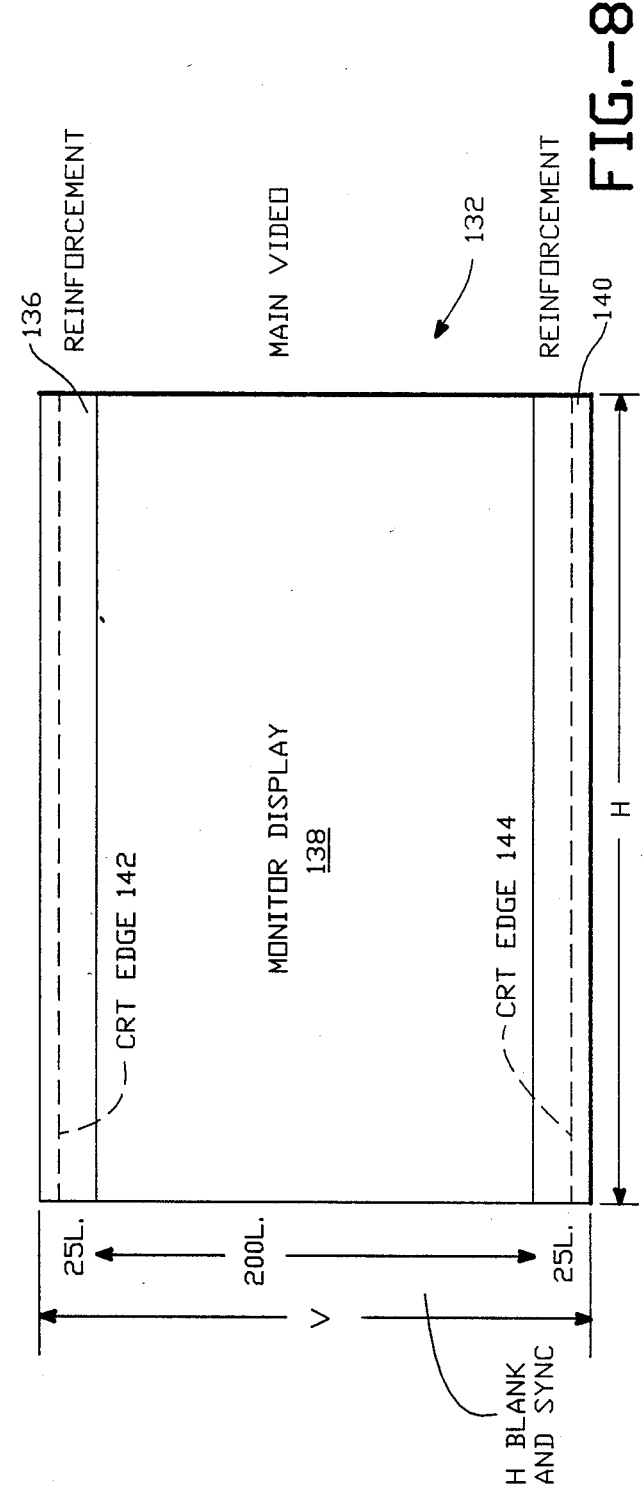
FIG.-7
FIG.-8

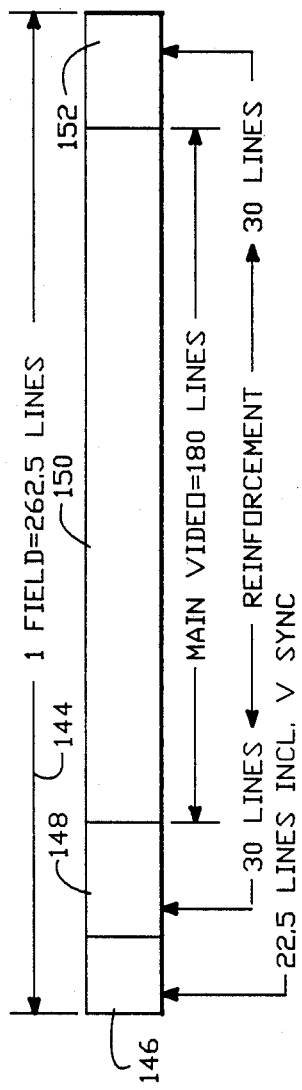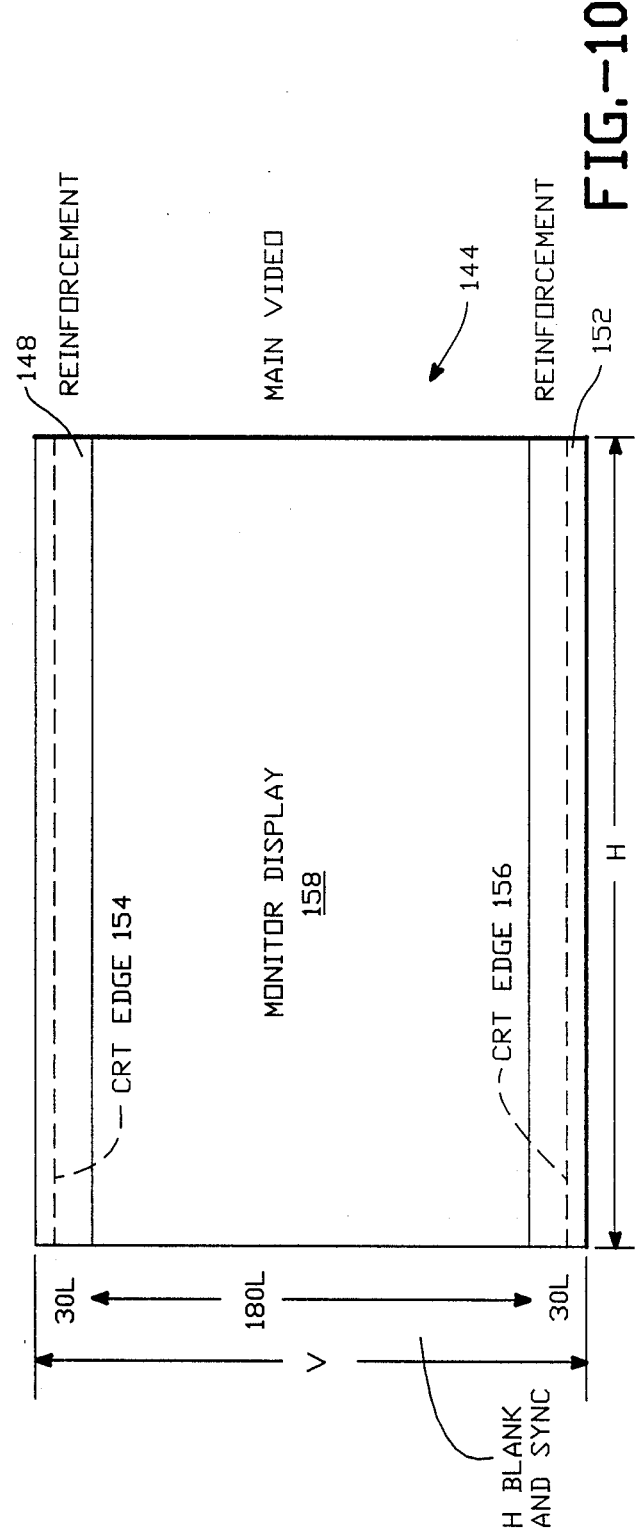

METHOD FOR MASKING PICTURE REINFORCEMENT SIGNALS CARRIED WITHIN THE VERTICAL INTERVAL

Related Application

This patent application is a continuation in part of U.S. patent application Ser. No. 07/350,940, filed on May 12, 1989, now abandoned, the disclosure of which is hereby incorporated by reference.

FIELD OF THE INVENTION

The present invention relates to television signal processing methods. More particularly, the present invention relates to a method for masking from visibility in conventional television displays picture reinforcement signals in the vertical interval which are useful in a predetermined manner to improve television picture image quality.

BACKGROUND OF THE INVENTION

In a conventional aspect ratio television picture signal format, such as the NTSC color television picture format for example, extra scan lines are available for carrying useful information. Such information may be vertical interval test information which is useful for monitoring bandwidth conditions of television network paths, or it may comprise digital caption information for the hearing-impaired viewer. In properly adjusted, conventional four to three aspect ratio television displays, the vertical interval scan lines are not visible. Even if the few lines devoted to special services are visible, since the special services information heretofore has not been coherent with the video information, the visibility of these lines carrying special services information has not been objectionable to the ordinary viewer. To those viewers equipped with special receiving apparatus, the special services information has been most useful.

When the raster of the picture display surface is underscanned, portions of the vertical interval, manifested visually as black horizontal bars, appear at the top and bottom of the picture, and any vertical interval information becomes visible within the black horizontal bar typically at the top of the picture image.

Some improved definition or improved quality television systems have been proposed for a wider format picture image having an increased aspect ratio. These changes in aspect ratio have been accompanied by visible scan lines at the top and at the bottom of the fully (properly) scanned picture, sometimes called a "letter box" approach. These scan lines are nominally manifested as dark or black horizontal bands across the conventional picture display.

With an aspect ratio of 1.61, an image transmitted within a conventional 4 to 3 or 1.33 aspect ratio channel (NTSC) frees 40 scan lines per field of information at the top and at the bottom of the picture image. When an aspect ratio of 1.77 is used in these systems, 60 lines per field are unused and are therefore free to carry picture reinforcement information. When the original 10 lines ordinarily available in conventional NTSC signal formats are added to these additional lines, and when an aspect ratio of 1.61 is employed, 200 active picture scan lines and 50 unused scan lines are present in each field. For the ratio of 1.77 there are 180 active lines and at least 60 unused lines. Thus, in the case of the 1.61 aspect ratio, the ratio of used to unused lines is four to one, whereas in the case of the 1.77 aspect ratio, the ratio of used to unused lines is reduced to three to one.

The significance of these used to unused ratios is that in the case of the 1.61 aspect ratio, the information needed to augment all areas of a picture may be carried with a time compression ratio of four; whereas in the case of the 1.77 aspect ratio, the compression required is only by three.

It has been proposed in the prior art to use the blanked lines in the higher aspect ratio systems to carry picture reinforcement information. Picture reinforcement information includes information useful for noise reduction as well as information which is useful for increasing resolution, particularly in scenes which are essentially free of motion over some time period, so that additional details of the image may be carried by multiple successive fields or frames. Sometimes, the additional information carried within a conventional spectrum for image enhancement is known as an "augmentation" signal. The term "reinforcement" as used herein is to be understood as including signals or information relating noise reduction, motion and/or augmentation signals.

The Nippon Television Network Corporation, Tokyo, Japan, (NTV) has proposed to carry high frequency components in the vertical region in order to increase static picture resolution. An article by Yosai Araki, Susumu Takayama, Shuji Hanafusa and Joji Urano entitled "NTSC Compatible Wide Aspect EDTV", published internally within NTV and made publicly available to various committees and organizations, sets forth the NTV proposal in some detail.

The present inventor has proposed in U.S. patent application Ser. No. 07/209,192, filed on Jun. 20, 1988, now U.S. Pat. No. 4,918,515, to carry preemphasis signals within spectral room present within a conventional TV channel in order to increase signal to noise ratios of the television image at the display device of the receiver. This prior patent is hereby incorporated by reference.

An article by William F. Schreiber and Andrew B. Lippman entitled "Reliable EDTV/HDTV Transmission in Low-Quality Analog Channels", *SMPTE Journal*, July 1989, pp. 496–503, proposes a system employing adaptive modulation of high frequency components and scrambling in order to aid resolution in visually very active areas of the picture and to disperse echoes and channel frequency distortions as random noise in the reconstructed picture. This article suggests that a reinforcement signal, such as a test signal, may be sent through the channel in order dynamically to adapt a correcting filter to channel degradation characteristics at the receiving end of the channel. Echoes and non-linear distortion may thereby be corrected.

On new receivers making effective use of a reinforcement signal or signals carried in the vertical interval, it is easy to cover the dark areas at the top and the bottom of the image (for example by using wider aspect ratio picture tubes). While older receivers following the conventional NTSC format four to three aspect ratio will be compatible with the wider format signal carrying the reinforcement signal, those older receivers will likely display some portions or all of the horizontal black bands at the top and at the bottom of the picture image, and within them the reinforcement signals.

The term "conventional", as used herein in connection with television displays, means that the display has an established prior art conventional display aspect ratio, such as four to three in NTSC, and will compatibly display an enhanced performance television video signal having an extended vertical blanking interval but with the added or extended portion of the interval as dark bands across the top and bottom of the display.

The main drawback of prior reinforcement schemes carried within the visible black bands or bars at the top and bottom of the picture of a conventional display is that the "augmentation" signal is typically coherent in real time with the picture image information being augmented. With a conventional picture tube or other image display device, the augmentation signal is visible and follows in some visible way the activity within the displayed picture image. Rather than remaining solid black or gray bars at the top and bottom on the conventional display device, these bars are now "alive" with light and dark regions and patterns which typically move as the displayed picture image moves and remain stationary when the picture image remains stationary. Thus, the information in the bars is "coherent" with the displayed picture image. As such, the now-visible augmentation signals constitute a major drawback and distraction to the viewer.

While video encryption and scrambling techniques, including reversing the amplitude of video scan lines, have been proposed to protect pay television channel revenues, those techniques have not been applied to the task of hiding or masking otherwise picture-content-coherent reinforcement information within an expanded or extended vertical interval of a downwardly compatible, enhanced performance television signal having a wider aspect ratio than heretofore.

Thus, a hitherto unsolved need has arisen to mask from conventional displays the picture image reinforcement signals carried within an expanded number of "blanked" scan lines appearing as dark bands at the top and bottom of expanded aspect ratio television signal formats on conventional television display devices.

SUMMARY OF THE INVENTION WITH OBJECTS

A general object of the present invention is to mask or hide a picture reinforcement signal within a vertical interval of a television signal in a manner which overcomes the limitations and drawbacks of the prior art.

A more specific object of the present invention is to provide a method and apparatus for effectively hiding picture-content-coherent reinforcement information within the vertical interval of a conventional picture signal so as not to distract a viewer upon viewing the signal on a conventional picture display, while simultaneously providing the augmentation information to an improved device capable of using the information to present a picture display which has been extended or improved in accordance with the reinforcement information.

Yet another more specific object of the present invention is to provide an effective method for transmitting extended definition, higher quality television picture signals having aspect ratios greater than conventional picture signals within the conventional picture signal format and wherein display of the extended definition, higher quality picture signals on a conventional display screen will not result in the appearance of objectionable, unwanted picture reinforcement artifacts on a conventional display.

In accordance with the principles of the present invention, a method is provided for generating a visually masked reinforcement signal for transmission in scan lines within a vertical blanking interval of a predetermined television video signal. The new method includes the steps of:

randomizing the reinforcement signal in accordance with a predetermined key, adding the randomized reinforcement signal to the vertical blanking interval of the video signal to produce a combined signal, and sending the combined signal through a television transmission path.

In one aspect of the invention, the randomizing step of the method includes the steps of:

generating a pseudo-random encode switching pattern for each scan line carrying the augmentation signal, the pattern preferably being identical for a said line within a group of lines and being different from line to line, the pattern switching between plus unity and minus unity over a duration selected to minimize sub-aliases within a frequency band of the video signal and of the augmentation signal, inverting the switching pattern on a basis integrally related to field rate and frame rate, multiplying the augmentation signal by the inverting switching pattern to provide a resultant product, gamma correcting the resultant product, and adding the resultant product to the vertical interval of the video signal to produce the combined signal.

In one other aspect of the present invention, the randomizing step of the method includes the steps of:

shuffling the scan lines carrying the reinforcement signal in accordance with a predetermined shuffling pattern, inverting the shuffled scan lines on a basis integrally related to field rate and frame rate, gamma correcting the inverted and shuffled scan lines to provide a processed reinforcement signal, and adding the processed reinforcement signal to the vertical interval of the video signal to produce the combined signal.

In one further aspect of the present invention, the video signal is in accordance with an aspect ratio which is greater than four to three, and the combined signal may be displayed on a conventional television display which displays an increased vertical blanking interval as horizontal black bars at the top and bottom of the television picture and wherein the reinforcement signal within the bars is so randomized as not to be coherent with any picture image then being displayed.

In accordance with another aspect of the present invention, a method is provided for enhancing display of a television picture with a reinforcement signal separated from a combined signal received through a television transmission path, the combined signal being prepared in accordance with the above method and comprising the steps of:

separating the reinforcement signal and the video signal from the combined signal in accordance with vertical interval information extracted by a sync separator, generating a pseudo-random decode switching signal which corresponds to the the pseudo-random encode switching signal, inverting the pseudo-random decode switching signal on the same basis integrally related to field and frame rate as was the pseudo-random encode switching signal and in phase therewith, multiplying the separated reinforcement signal by the inverting pseudo-random decode switching signal to provide a resultant decode product, and combining the resultant decode product in proper phase relationship with the separated video signal in order to provide a performance enhanced video display. In this further aspect when the separated video signal is in accordance with an aspect ratio which is greater than four to three, the combined signal may be displayed on a conventional television display which displays an increased vertical blanking interval as horizontal black bars at the top and bottom of the television picture and the reinforcement signal within the bars will not be coherent with any picture image being displayed.

Widened aspect ratios of the video signal may be approximately 1.61 or approximately 1.77.

The reinforcement signal may be a luminance component preemphasis signal lying substantially in a frequency range between zero and 2 MHz, or it may be a bandwidth expansion signal for expanding the bandwidth of a luminance component of the video signal from 4 MHz to approximately 6-7 MHz.

The reinforcement signal may also be representative of the motion of objects displayed within the picture image. After compression and transmission with the main image signal, the motion reinforcement signal may be recovered, processed and used in order to simplify, improve and cost-reduce noise reduction, color decoding and/or line doubling processes of the received image at the enhanced display device.

The reinforcement signal may be compressed in at least one of the time and space domains of the video signal, for transmission on scan lines otherwise lying within the vertical interval of the video signal. The reinforcement signal has an amplitude preferably lying in a range of minus ten IRE units and plus thirty IRE units.

In accordance with a further aspect of the present invention, the reinforcement signal has been gamma corrected prior to insertion in the vertical interval and the method for providing an enhanced display includes the further step of inverse gamma correcting the resultant decode product before it is added to the separated video signal.

These and other objects, advantages, aspects and features of the present invention will be more fully understood and appreciated by considering the following detailed description of a preferred embodiment, presented in conjunction with the accompanying drawing.

BRIEF DESCRIPTION OF THE DRAWINGS

In the Drawings:

FIG. 7 is a timing chart of a television field of a wide aspect (1.62) ratio television picture signal format in which an expanded vertical blanking interval may be provided with picture reinforcement information in accordance with the principles of the present invention.

FIG. 8 is a vertical and horizontal timing graph of the FIG. 7 wide aspect ratio television field.

FIG. 9 is a timing chart of a television field of a very wide aspect (1.77) ratio television picture signal format in which an expanded vertical blanking interval may be provided with picture reinforcement information in accordance with the principles of the present invention.

FIG. 10 is a vertical and horizontal timing graph of the FIG. 9 very wide aspect ratio television field.

DETAILED DESCRIPTION OF A PREFERRED EMBODIMENT

Figure 1A:
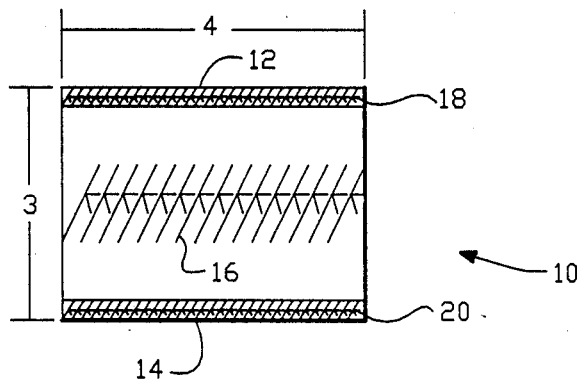
FIGS. 1A and 1B illustrate respectively the appearance of overscan horizontal bars carrying a reinforcement signal at the top and bottom of a conventional display and the absence of the bars on an extended performance display device of the type used with the FIG. 2 apparatus.

FIG. 1A illustrates a conventional picture display 10 having a four to three aspect ratio such as is the convention with NTSC, for example. When this display 10 is used to carry a compatible extended definition picture having a higher aspect ratio, such as is being presented in an approximately eight to five (1.61) ratio on the extended performance display device 11 graphed in FIG. 1B, display 10 displays a horizontal bar 12 at the top of the picture and a horizontal bar 14 at the bottom of the picture. A main picture signal 16 is shown diagrammatically by hatching within the open space of the display 10 between the top bar 12 and the bottom bar 14.

When picture reinforcement information is carried in the bars 12 and 14, the reinforcement signals 18 and 20 (shown in micro-cross hatching within the bars 12 and 14) bear visual resemblance or coherence in time and in some visually perceptible manner with the main picture signal 16. For example, as visual images move within the main picture signal 16, visual movements simultaneously occur within the reinforcement signals 18 and 20 occur in some manner correlated to or perceptibly coherent with the movements within the main picture signal 16. While no reinforcement information is visible within the FIG. 1B enhanced performance display device 11 which effectively uses the augmentation information to achieve an enhanced or improved visual presentation 16' of the main video signal, the visibility of the reinforcement information 18, 20 simultaneously present with the main path information 16 within the conventional display 10 is a visual manifestation of one problem solved by the present invention.

A transmission system within a television signal path includes a subsystem 22 which incorporates principles of the present invention. The subsystem 22 includes three inputs: a main path video input 24 which carries either monochrome or color television video in e.g. NTSC format, without any reinforcement information; a sync input 26 which provides necessary timing and phase relationship information to the subsystem 22, and an input 28 carrying a signal comprising or providing a reinforcement signal to be added to the main path video.

The reinforcement signal input 28 leads directly to an reinforcement circuit signal processor 30. The processor 30 derives and compresses the reinforcement signal into information which may be contained within scan lines of the vertical interval, such as within the top and bottom horizontal bars 12 and 14 in a wide aspect ratio picture signal. The compression may occur within the spatial domain and/or the temporal domain. Usually, the temporal domain provides more opportunity for compression, since the eye is satisfied with lower resolution and higher signal to noise ratios during periods of significant movement in the picture display, and tends to notice picture shortcomings only during static scenes. Any of the known compression techniques may be employed by the processor 30, and the precise nature of the compression is unimportant to an understanding of the present invention. An output from the processor 30 leads directly as a multiplicand input of a multiplier 32.

The sync input 26 leads to a pseudo-random sequence generator 34. The generator 34 generates a switching interval which switches between plus one and minus one essentially on a pseudo-random basis over the duration of a line scan of the television picture. The pseudo-random pattern is precisely known in accordance with a predetermined key, and its duration is extended to all scan lines within the extended/expanded vertical blanking interval which will carry the augmentation signal provided by the processor 30.

The sync input also enters a bifield switch signal generator 36. This bifield switch signal generator 36 generates and puts out a square wave which has a period (e.g. about 30 Hz in NTSC) twice as long as the period of the field rate (e.g. about 60 Hz in NTSC) of the sync incoming over the line 26. The square wave is used to control a field to field inverter 38 which inverts the random pattern put out by the pseudo-random sequence generator 34 on a field by field basis. The output from the inverter 38 provides a multiplier input to the multiplier circuit 32. The multiplier input is essentially either plus unity or minus unity. The transition between plus and minus is carefully controlled so as not to result in subNyquist aliases located within any portion of the spectrum of the reinforcement or mainpath signal. For a noise reduction reinforcement signal, the transition should occur over a time interval not less than about one half microsecond nor longer than about two to three microseconds. It will be appreciated by those skilled in the art that the amplitude of the reinforcement signal will be lost each time the randomly occuring transition passes through zero in its excursion between plus unity and minus unity. Thus, the number of transitions should be kept relatively infrequent with respect to a particular scan line carrying the reinforcement information. The duration of each segment of the randomization signal should be generally no less than about 5 microseconds nor longer than about 15 to 20 microseconds.

While the random pattern put out by the sequence generator 34 repeats for a particular scan line within the vertical interval, preferably, the pseudo-random pattern is different for each one of the scan lines carrying the reinforcement information. Thus, there will be no coherence upon display of the pattern from scan line to scan line.

The product put out by the multiplier circuit 32 leads through a gamma corrector circuit 40 which compensates for the gamma characteristic of conventional cathode ray tube displays, such as the display 10 of FIG. 1A. The gamma corrected, field inverting augmentation signal is then added to the main path video in a vertical interval insertion circuit 42. The combined signal is then put out over a transmission path (broadcast, cable, video recording, etc.) leading to a display device. The conventional display device 10 will reproduce the dark horizontal bars 12 and 14 at the top and bottom of the picture, but without any visible patterns which are content-coherent with the main picture image 16.

However, the enhanced display device 11 will actually decode the reinforcement information carried in the bands 12 and 14 of the vertical blanking interval and use the reinforcement information to improve and enhance the image 16. Both displays 10 and 11 effectively receive and display the main path video signal 16, and importantly, the conventional display does not present visual distractions within the bars 12 or 14. How this is accomplished will now be explained with reference to FIG. 3.

Figure 3:
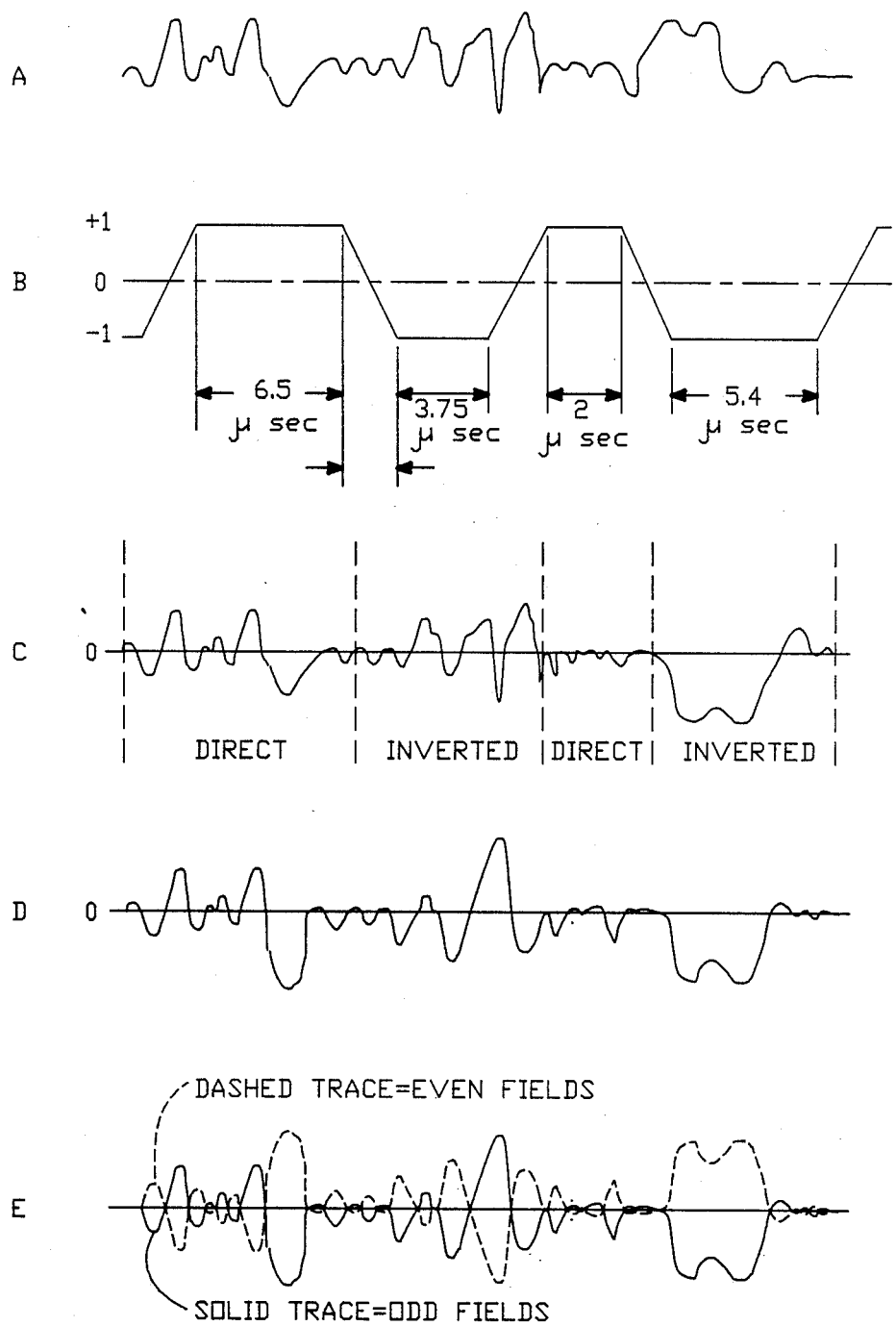
FIG. 3 is a series of graphs of waveforms which illustrate the manner of operation of the FIG. 2 apparatus.

A reinforcement signal is graphed as waveform A of FIG. 3. It is this signal which is developed and put out by the processor 30 to the multiplier circuit 32 as the multiplicand. The multiplier value put out by the field to field inverter 38 to the multiplier circuit 32 is graphed as waveform B of FIG. 3. The actual intervals at which the multipler value is at plus unity and at minus unity are made to be quite random, so that any coherence of the reinforcement signal with the main picture image 16 is broken up and essentially rendered incoherent. After the reinforcement signal has been pseudo-randomized by operation of the multiplier circuit 32, the resultant waveform looks like graph C in FIG. 3.

In order for the reinforcement signal to remain below a level of visiblity within the top and bottom horizontal bars 12 and 14 of the conventional display 10, the maximum amplitude of the reinforcement signal must be kept fairly low. A compromise is made between signal to noise and the level of visual perceptibility. Preferably, the reinforcement signal is made to occupy an amplitude range of $-10$ IRE units to $+30$ IRE units. This limited dynamic range is sufficient for most television transmission systems to provide a healthy, robust reinforcement signal through all but the most severely degraded signal paths.

Cathode ray tubes which are universally employed as television displays have a very well known non-linear signal to light characteristic known as gamma. This curve is typically in the range of $x^{2.8}$ to $x^3$. In practical terms the gamma characteristic means that a signal at $+30$ IRE units is much more visible as light than a signal at say $+15$ IRE units. Putting it another way, the visibility of a signal at $+30$ IRE units is only about three percent (3%) of the visibility of a signal at 100 IRE units.

In order for the present invention effectively to mask the reinforcement signal from visibility on a conventional television display, the gamma characteristic of that display must be taken into account. Thus, the circuit 40 corrects for the nonlinearity of the conventional display 10 by emphasizing the reinforcement signal as an inverse function of gamma. The resultant emphasis or correction is graphed as waveform D of FIG. 3.

When the gamma corrected reinforcement signal is displayed within the horizontal bars 12 and 14 of the conventional television display 10, and further, when the signal is inverted on a field by field basis, the eye effectively integrates the very low level visual variations of the reinforcement signal into a solid, incoherent unnoticeable band or strip. In some instances, close observation may reveal a similarity between the reinforcement signal and random noise within the bar. Since low-visibility noise in a black region of a conventional picture is virtually undetectable, and is certainly unobjectionable to the eye, the present invention effectively hides from the viewer a very robust reinforcement signal within the visible horizontal bands during enhanced signal format transmissions displayed on the conventional display CRT screen 10.

Figure 1B:
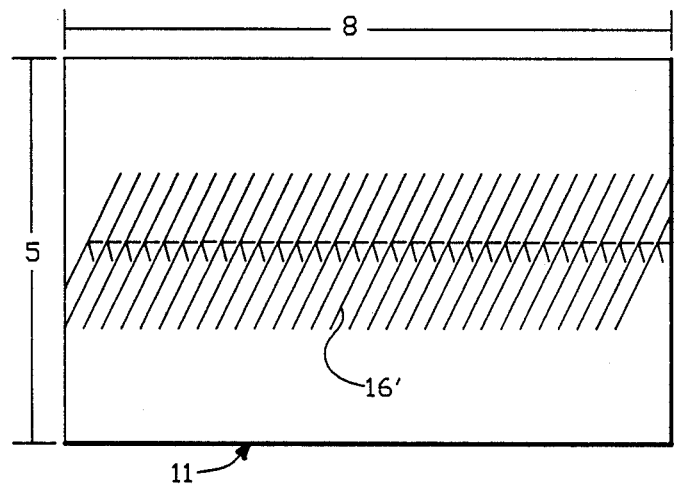
Figure 4:
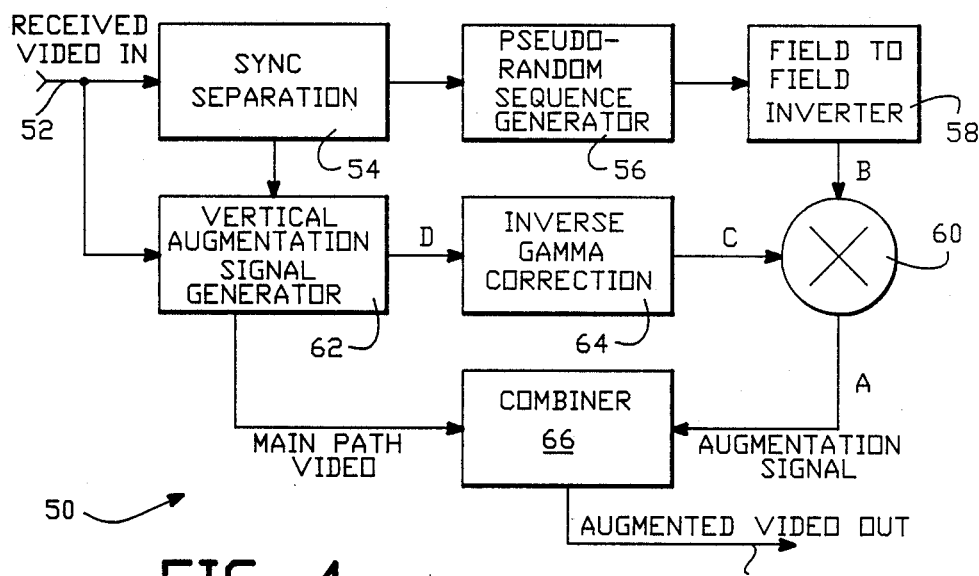
FIG. 4 is a block diagram of apparatus within a television receiver/display device which makes use of the reinforcement signal produced by the FIG. 2 apparatus.
Figure 2:
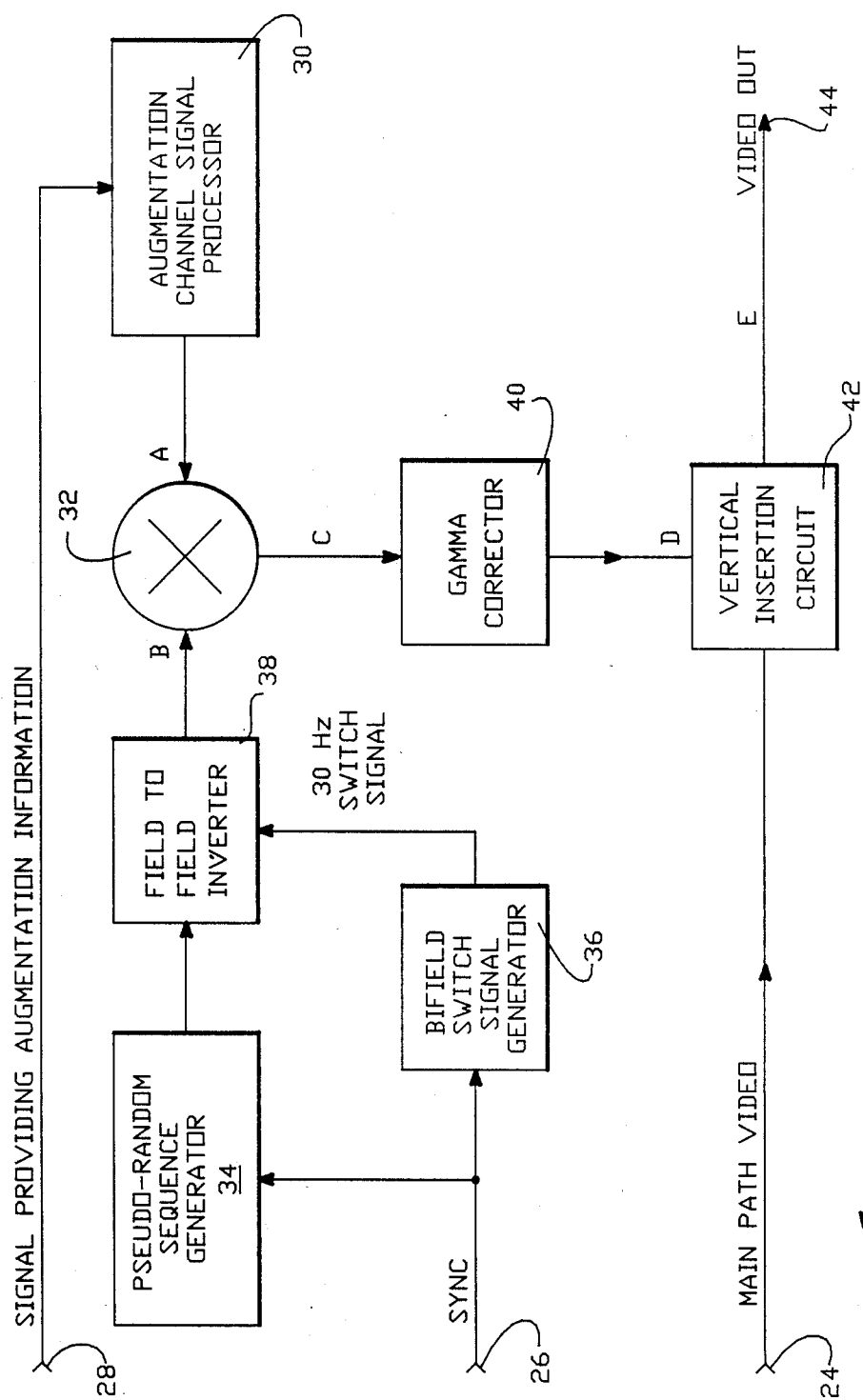
FIG. 2 is a block diagram of apparatus incorporating the method of the present invention at a picture generation or transmission location

FIG. 4 illustrates a reinforcement signal recovery circuit 50 for inclusion within the extended performance television display 11 of FIG. 1B. The circuit 50 includes an input node for receiving the composite video containing the reinforcement signal within otherwise unused scan lines lying in the expanded vertical interval. A conventional sync separator circuit 54 extracts sync information from the incoming video and uses the line scan rate to trigger a pseudo-random sequence generator 56. The generator 56 generates a pseudo-random sequence which is identical with the sequence generated by the generator 34 of the transmission subsystem 22 depicted in FIG. 2. The sequence may be contained in a programmed memory array within the generator 56, or it may be downloaded initially or periodically over the transmission path from the transmission subsystem 22 and stored in local RAM within the generator 56. In any event, for the system to work, the same pseudo-random sequence key must be used in the circuit 50 in a phase-locked relationship with the sequence as used within the transmission subsystem 22. Conventional sync phase lock techniques are adequate to provide phase correlation between the circuits 22 and 50.

A field to field inverter 58 provides the field to field inversion of the pseudo-random sequence put out by the generator 56. This field inverted sequence then becomes a multiplier signal sent to a multiplier circuit 60. The multipler signal switches between plus unity and minus unity as graphed in waveform B of FIG. 3.

A vertical blanking interval reinforcement signal separator 62 is also connected to receive the video at the input 52. In accordance with vertical timing and scan line timing information received from the sync separator 54, the reinforcement signal separator 62 extracts the augmentation signal, waveform E of FIG. 3, from the scan lines within the bars 12 and 14 of the vertical interval.

Since the reinforcement signal has been corrected for gamma, it must be returned to a likeness of its original wave shape, and this task is carried out within an inverse gamma correction circuit 64. The output of the correction circuit 64 provides a multiplicand input to the multiplier circuit 60.

The resultant product of the multiplier circuit 60 comprises a likeness of the original reinforcement signal, waveform A of FIG. 3, subject to any modifications resulting from a degrading transmission path. This resultant product, along with main path video from the separator circuit 62, is provided to a combiner circuit 66 which effectively employs the reinforcement signal to enhance the characteristics of the main path video in some predetermined fashion. Those skilled in the art will appreciate that proper delays will be included within the subsystem 22 and within the circuit 50, so that the reinforcement signal at the combiner 66 is in proper phase relation with the main path video signal. The enhanced video signal is then put out to the wide aspect ratio display element 11 of the receiver and displayed as the enhanced signal 16'.

One presently preferred type of display device capable of enhanced display may include line doubling and temporal median filter techniques. These concepts are set forth in a commonly owned, copending patent application, Ser. No. 07/334,004 filed on Apr. 5, 1989, for "Television Scan Line Doubler Including Temporal Median Filter", the disclosure of which is hereby incorporated by reference.

The reinforcement signal can be used to provide noise reduction within a low frequency portion of luminance, such as zero to 2 MHz. A preemphasis component such as is produced within the system described in the referenced and incorporated patent application, Ser. No. 07/209,192, now U.S. Pat. No. 4,918,515, may be compressed in the spatial and/or temporal domains and then included as an amplitude variant signal within the −10 to +30 IRE unit range in the additional scan lines included in the expanded vertical interval.

Alternatively, the reinforcement signal may be a bandwidth expansion component lying in a range from e.g. 4 MHz to 6 MHz. This bandwidth expansion signal may be hetrodyned down to a range lying between zero to 2MHz and then treated in the same manner as was the noise reduction augmentation signal given in the first application example given just above.

Alternatively, the reinforcement signal may be a signal marking the location of image motion within the picture image. In this case, the motion signal may require only a very few lines, such as five to ten lines, which are already essentially available within the conventional vertical blanking interval. As is known, recursive signal to noise reduction processes average picture content over successive fields. In areas of motion, the averaging process may be stopped, or the averaging algorithm may be adaptively changed, in response to noise reduction-motion reinforcement information. Very little actual information is required to convey very useful information regarding picture motion conditions. A two bit signal is capable of conveying four separate motion conditions. Also, the precision of the motion zone of the picture image may be very coarsely defined, so long as the area of motion within the picture is overestimated.

The motion signal is also most useful for resolution reinforcement. Whenever there is no motion, and the picture is essentially static from field to field (a condition in which the eye is most sensitive to picture resolution) the reinforcement information in the vertical blanking interval scan lines may be used to carry additional high frequency information and thereby reinforce resolution over several fields or frames. However, when motion occurs, the reinforcement signal may switch to carry the motion location information, thereby to alter resolution and/or noise reduction processes.

Figure 5:
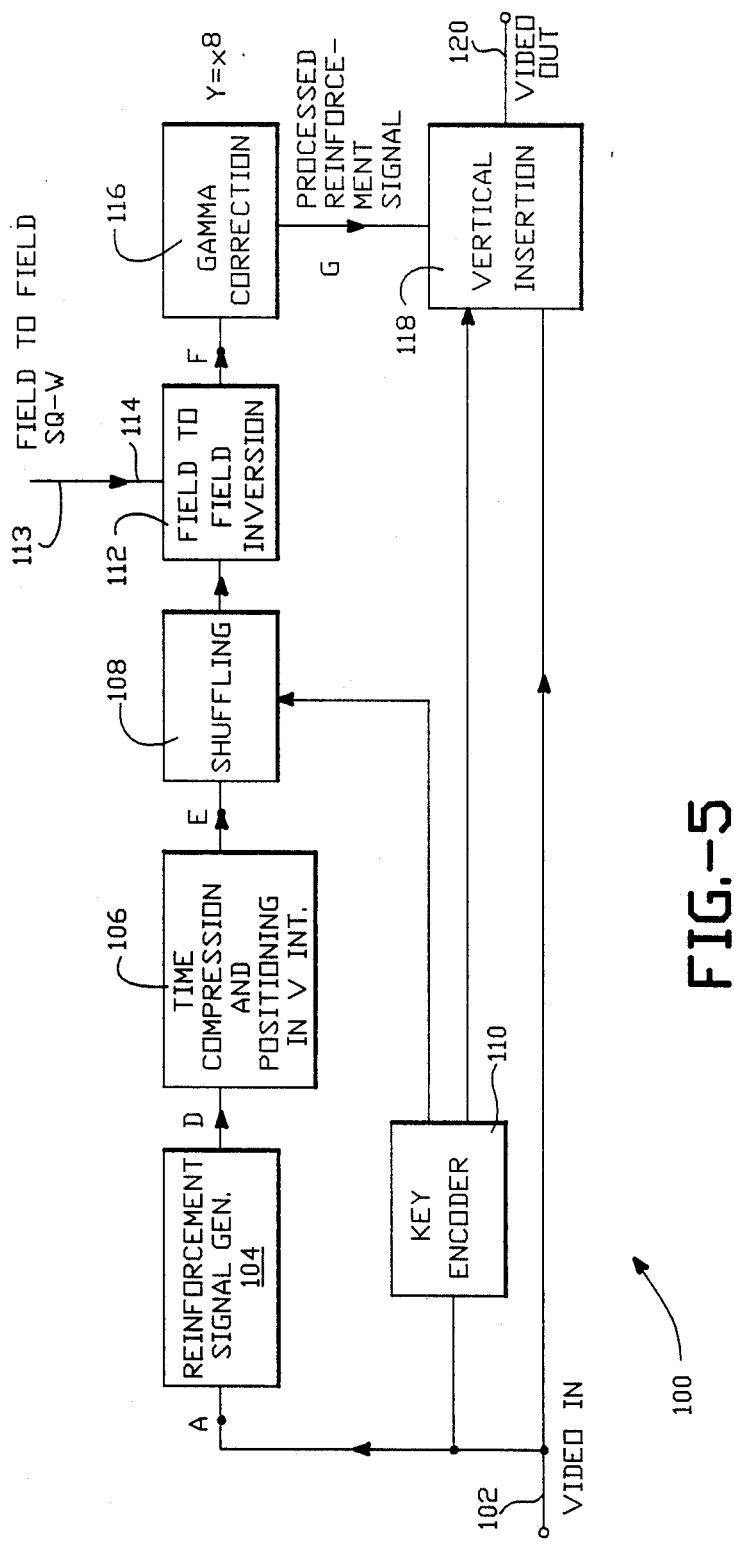
FIG. 5 is a block diagram of an alternative apparatus incorporating the method of the present invention at a picture generation or transmission location.

An alternative embodiment of the present invention is disclosed and described hereinafter in conjunction with FIGS. 5 through 15. With reference to FIG. 5, a transmission reinforcement signal processor 100 includes a video input 102 for receiving a video signal to be reinforced in a predetermined manner. The signal at the video input 102 is sent to a reinforcement signal generator 104 which generates the reinforcement signal based upon predetermined criteria and dynamic signal content. The reinforcement signal may be a motion signal, a resolution (bandwidth) enhancement signal, or a noise reduction signal (or a static or dynamic combination of the foregoing; a noise reduction example is provided in conjunction with FIGS. 12 through 15 discussed hereinafter).

After the reinforcement signal is generated by the reinforcement signal generator 104 it is then time-compressed and positioned within the vertical interval by a time compression and positioning circuit 106. The vertical interval scan lines now carrying the compressed reinforcement signal are then positionally shuffled by a shuffling circuit 108. While the shuffling circuit 108 preferably shuffles scan line blocks of information, and discrete unit of the picture, from scan line to pixel may be shuffled in accordance with the principles of the present invention. A shuffling key encoder circuit 110 generates a shuffling key signal and applies it to control operation of the shuffling circuit 108. If the key is invariant, then it is merely duplicated within reception signal processing equipment. However, if the key is dynamically generated or dependent upon the incoming signal, as shown in FIG. 5, the key itself is inserted at a predetermined location into the vertical interval by an insertion circuit 118, described hereinbelow.

After shuffling, the scan lines are inverted on a field by field basis within an inversion circuit 112 operating in response to a frame rate square wave switching signal on a line 113 (60 Hz in the NTSC signal format). The shuffled and field by field inverted reinforcement-signal-bearing scan lines are then subjected to gamma correction in a gamma correction circuit 116 for reasons previously explained to yield a fully processed reinforcement signal. This signal is then added (together with the dynamic shuffling key) to the vertical interval by the insertion circuit 118 which inserts it into the video signal on the input line 102. The combined video signal is then put out at an output 120 leading to a transmission path.

Figure 6:
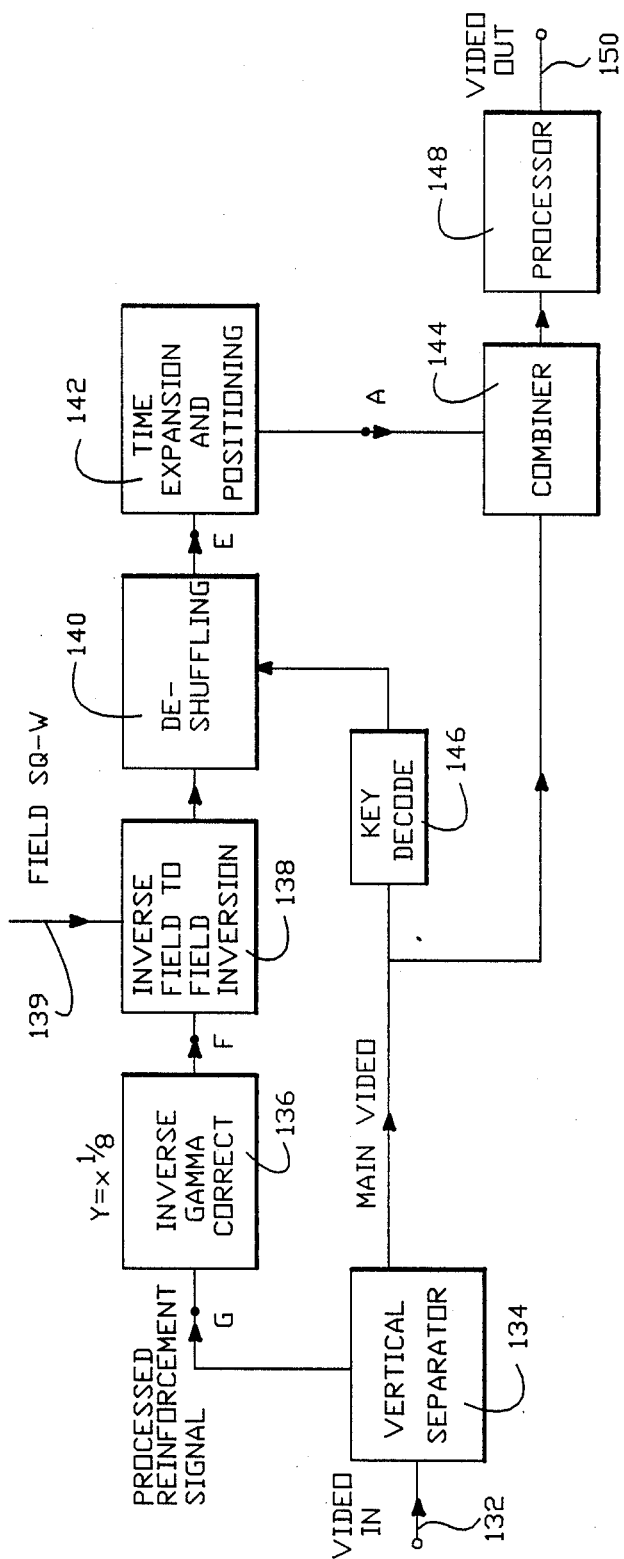
FIG. 6 is a block diagram of apparatus within a television receiver/display device which makes use of the reinforcement signal produced by the FIG. 5 apparatus.

FIG. 6 illustrates a reception reinforcement signal processor 130 which is compatible with the transmission processor 100 of FIG. 5. The reception reinforcement signal processor 130 is provided within improved television receivers/display devices which provide image displays which are reinforced by the presence of the reinforcement signal hidden in the vertical interval.

Degraded video is received via a path from the transmission processor 100 at an input 132 and enters a vertical separator 134 which separates the reinforcement signal in the vertical interval from the main video signal. The reinforcement signal is then subjected to inverse gamma correction in an inverse gamma corrector circuit 136 whose gamma correction characteristic is an inverse of the characteristic followed by the circuit 116.

Next, the reinforcement signal is restored by inverse field to field inversion by a field restoration circuit 138 controlled by a field rate square wave switching signal on a line 139. Next, the reinforcement signal scan lines are deshuffled in a deshuffling circuit 140 which returns e.g. the scan lines carrying the reinforcement signal to their original order. The decoded reinforcement signal is then expanded and positioned in time by a time expansion and positioning circuit and is then combined with main path video from the vertical separator circuit 134 within a combiner circuit 144. A shuffling key decoder circuit 146 generates a deshuffling key. The deshuffling key may be static and predetermined by the circuit 146, or it may be derived dynamically from the incoming video as function of the key inserted into the vertical interval by the key encoder circuit 110, as previously explained.

A processor circuit 148 which may be included within the combiner circuit 144, or which may follow it as shown in FIG. 6, processes the main path video in order to improve its quality for display in accordance with the reinforcement signal. If, for example, the reinforcement signal is a preemphasis signal for noise reduction, then the processor 148 deemphasizes the composite video signal. If the reinforcement signal is a bandwidth expansion or enhancement signal, it is used to manipulate and enhance the main path video to restore or add high frequency details to the incoming picture image signal stream.

FIGS. 7 and 8 are two related timing diagrams relating to the format of a wide aspect (1.62) ratio signal format. FIG. 7 graphs the signal in the horizontal dimension, whereas FIG. 8 graphs the signal bidimensionally along the horizontal and vertical dimensions. The horizontal dimension 132 of FIG. 7 depicts one field duration within the NTSC signal format as including 262.5 scan lines. Of these lines, 12.5 lines in a region 134 contain vertical sync information. Twenty five scan lines in a region 136 are available for reinforcement information. Two hundred scan lines in a main region 138 contain the main path video image information; and, twenty five lines in a region 140 following the main region 138 are also available for reinforcement information.

FIG. 8 expands the FIG. 7 timing diagram into the vertical domain. In FIG. 8, the reinforcement regions 136 and 140 are respectively located at the top and bottom of the bidimensional format. A monitor display, unless intentionally underscanned, will crop some or all of the reinforcement regions 136 and 140. Dashed horizontal lines 142 and 144 denote nominal display edges of a resultant image display on a conventional monitor or display device.

FIGS. 9 and 10 duplicate FIGS. 7 and 8, except that the aspect ratio (1.77) is even wider than that shown in FIGS. 7 and 8. In FIGS. 9 and 10, the field interval 144 has the same size or time duration as previously (262.5 nominal scan lines). However, 22.5 lines in a region 146 are provided for vertical sync. A region 148 of 30 scan lines at the top of the bidimensional timing presentation (FIG. 10) provides a first reinforcement signal region. A main signal region 150 contains 180 scan lines carrying the main picture image. A bottom region 152 contains an additional 30 scan lines for reinforcement information. Again, dashed horizontal lines 154 and 156 denote cropping of a properly adjusted conventional display device.

Figure 11A:
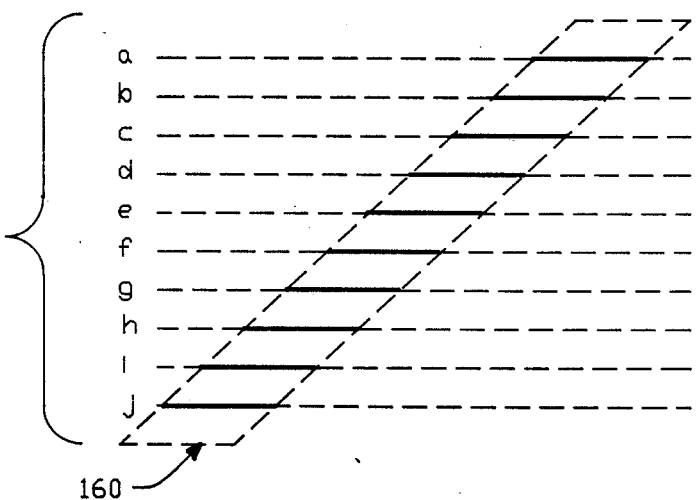
FIGS. 11A, 11B and 11C graph line shuffling of reinforcement information scan lines in accordance with the method of the FIG. 5 apparatus and line deshuffling of reinforcement information in accordance with the method of the FIG. 6 apparatus.
Figure 11B:
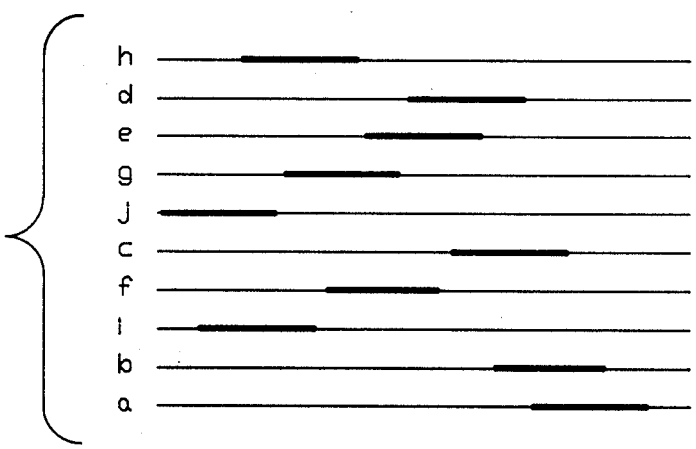
Figure 11C:
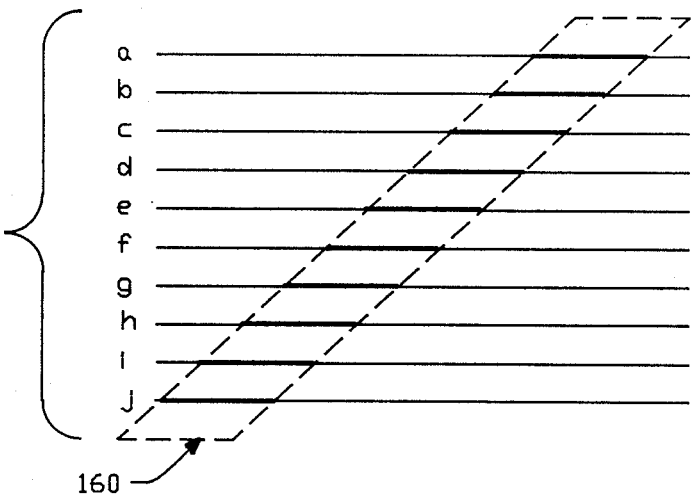

FIGS. 11A, 11B and 11C illustrate one example of shuffling performed by the circuit 108 of the transmission processor 100 of FIG. 5, and deshuffling performed by the circuit 140 of the reception processor 130 of FIG. 6. Assume that the reinforcement signal is provided in ten scan lines a through j as shown in FIG. 11A. The unshuffled reinforcement signal includes a diagonal line or bar enclosed by dashed lines and denoted 160 in FIG. 11A. This bar is coherent with pictorial content present in the main picture image and will distract the viewer when viewing a conventional display device. Consequently, shuffling is performed. A shuffling pattern, generated by the shuffling key generator 110 rearranges the scan lines as h, d, e, g, j, c, f, i, b, a, as shown in FIG. 11B. This pattern randomizes the bar 160 in accordance with the principles of the present invention. When the random pattern is subjected to field by field inversion (during the first field the bar components are dark whereas during the next field the bar components are light) a further 6 db reduction in visibility is achieved. The original pattern 160 is reconstituted, FIG. 11C, by the deshuffling circuit 140 in accordance with an inverse of the FIG. 11B shuffling pattern, as generated by the key decoder circuit 146.

Figure 12:
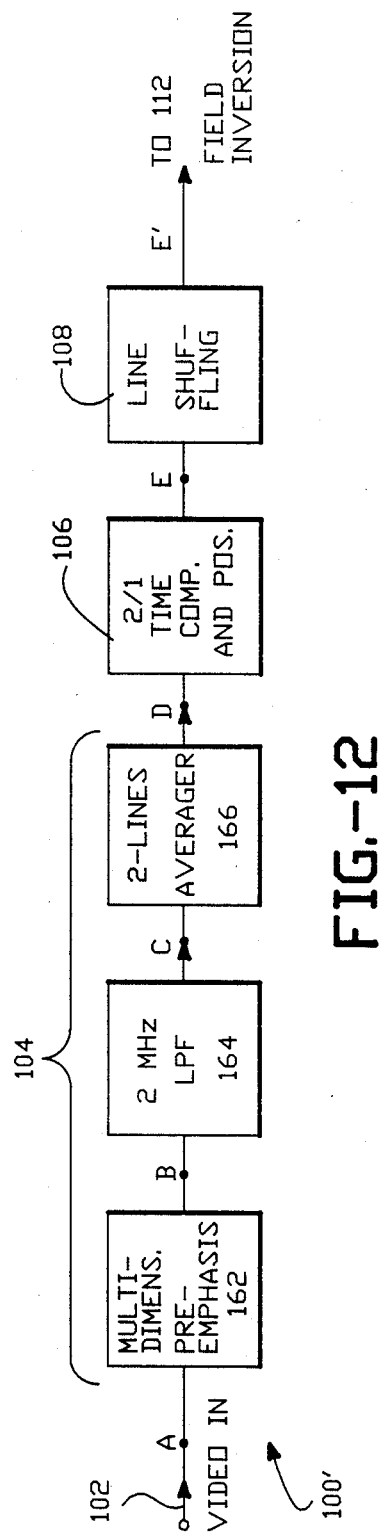
FIG. 12 is a more detailed block diagram of the FIG. 5 apparatus wherein the reinforcement signal is used for noise reduction in the resultant picture image display provided by an enhanced display device.
Figure 13:
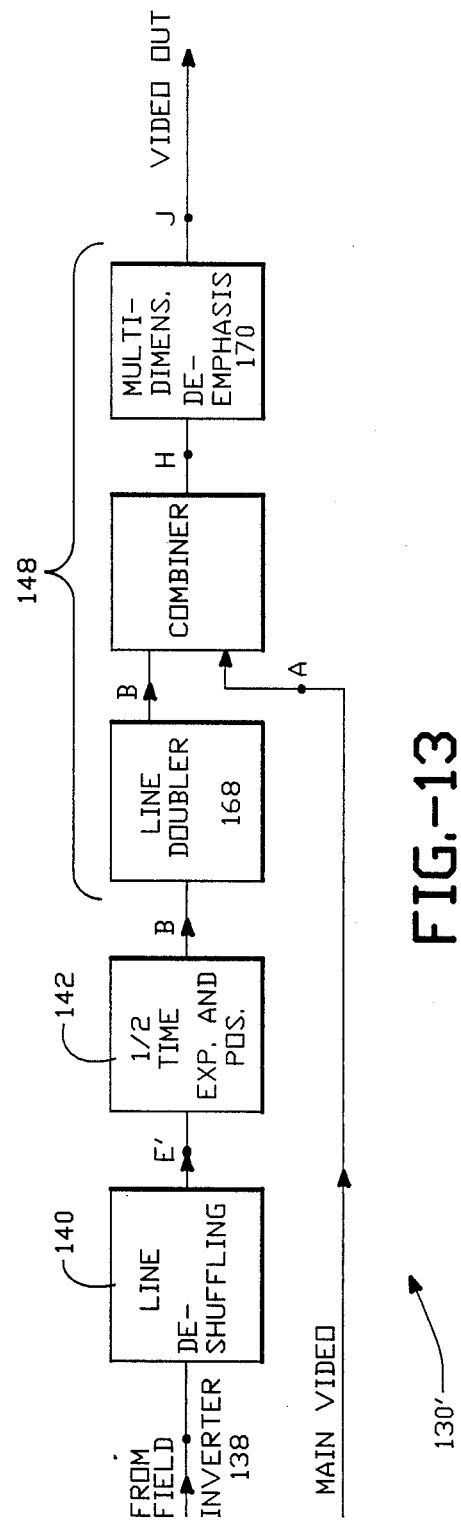
FIG. 13 is a more detailed block diagram of the FIG. 6 display apparatus wherein the reinforcement signal is used for noise reduction in the resultant picture image display.
Figure 14:
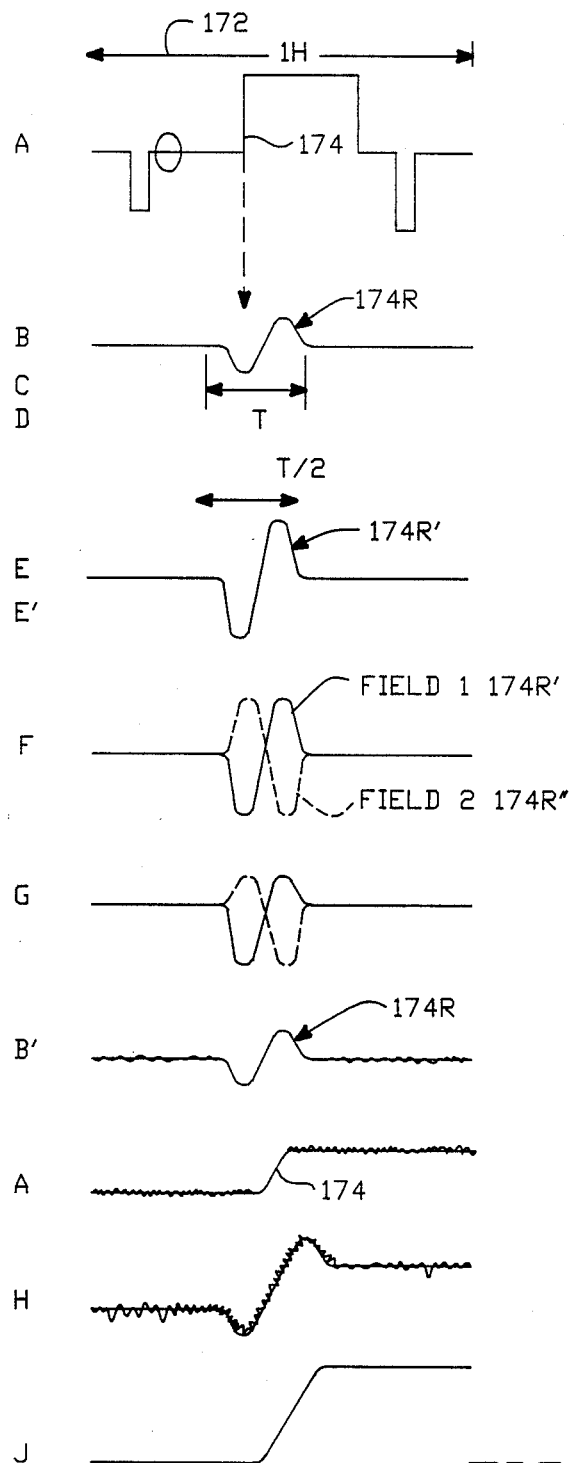
FIG. 14 sets forth a series of timing diagrams which illustrate the operation of the FIG. 12 and FIG. 13 devices.

FIGS. 12, 13 and 14 illustrate a specific embodiment of the FIGS. 5 and 6 processors wherein the reinforcement signal is applied to noise reduction. The transmission processor 100' of FIG. 12 includes within the reinforcement signal generator 104 a multi-dimensional preemphasis circuit 162, followed by a low pass filter 164 having a cutoff at approximately 2 MHz, followed by a two-lines averager 166. The time compression and positioning circuit 106 compresses the reinforcement information into one half the original time by conventional line doubler techniques, and scan line shuffling follows in the shuffling circuit 108.

In the reception processor 130' the processor 148 is seen as including a line doubler 168 located between the time expander 142 and combiner 144 which doubles the duration of each time compressed reinforcement signal scan line to its original duration before the reinforcement signals are added to enhance the details of the main picture image in the combiner circuit 144. A multidimensional de-emphasis circuit 170 then deemphasizes the resultant reinforced picture image as an inverse funtion of the multi-dimensional preemphasis circuit 162 which generated the noise reduction reinforcement signals, thereby achieving multi-dimensional noise reduction. Further details of multi-dimensional noise reduction techniques are included in the referenced and incorporated U.S. patent application Ser. No. 07/209,192 filed on June 20, 1988, now U.S. Pat. No. 4,918,515, to which the interested reader is referred for further details.

With reference to graph A set forth in FIG. 14, a scan line n, labelled with reference numeral 172, includes a transitional edge 174. This edge is preemphasized at the preemphasis element 162, graph B; low pass filtered at the filter 164, graph C; and averaged over two lines in the averager 166, graph D. Graphs B, C and D are shown to be identical, although the elements 162, 164 and 166 perform distinctly different processes upon the transition 174 as described hereinabove in order to generate the reinforcement signal 174R. The two-to-one time compression circuit and positioning circuit 106 reduces the duration of the transition 174R by half and positions it within the expanded vertical blanking interval.

Figure 15:
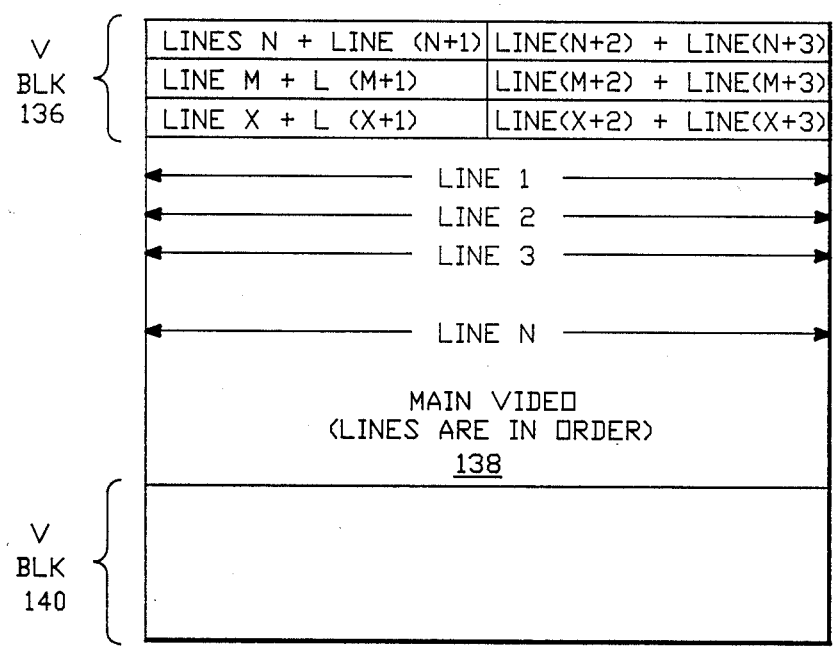
FIG. 15 graphs the transmitted raster pattern put out by the transmission processor 100' depicted in FIG. 12.

As shown in the FIG. 15 raster pattern, the top portion 136 of the vertical blanking interval available for reinforcement scan lines (1.62 aspect ratio, FIGS. 7 and 8) may include reinforcement information scan lines n, m and x in shuffled sequence as shuffled by the line shuffler 108. The first reinforcement scan line may contain reinforcement information for original lines n+0, n+1, N+2 and N+3; the next reinforcement scan line may contain reinforcement information for original scan lines m+0, M+1, M+2 and M+3; and the next reinforcement scan line may contain reinforcement information for original scan lines x+0, x+1, x+2, and x+3. Thus, in the case of the 1.62 wide aspect ratio signal format, each reinforcement scan line n, m or x contains reinforcement information for four scan lines of the main picture image signal present in the region 133.

Returning to FIG. 14, graph F shows the reinforcement signal 174R' for the first field in solid outline, and shows the field inverted signal 174" in broken line. This signal is present at the output of the field-by-field inverter 112 of FIG. 5. Graph G shows the effect of gamma correction provided by the gamma correction circuit 116 of FIG. 5. This signal is also present at the output of the vertical separator 134 of the reception processor 130.

The inverse gamma correction circuit 136 removes the gamma correction and restores the graph F signal, and the inverse field-by-field inversion circuit 138 and deshuffling circuit 140 restores the reinforcement signal 174R' to its graph E format. The one to two time expander and repositioner circuit 142 and the line doubler circuit restore the reinforcement signal 174R to its graph B form.

The combiner circuit 144 then combines in proper time and phase the noisy transition 174 of the received main path video signal stream as separated by the separator 134 (graph A) with the recovered reinforcement signal 174R (graph B') to yield a composite, graph H in which the transition is characterized by preshoot and overshoot. After multi-dimensional de-emphasis in the block 170, a noise reduced transition (graph J) is put out for display upon the display screen of the reception apparatus including the processor 130'.

While the method and apparatus of the present invention have been summarized and explained by an illustrative application in compatible television transmission systems with a masked augmentation signal for enhanced performance display and without distraction when displayed on a conventional device, it will be readily apparent to those skilled in the art that many widely varying embodiments and applications are within the teaching and scope of the present invention, and that the examples herein are by way of illustration only and should not be construed as limiting the scope of this invention.

I claim:

1. A method for generating a visually masked reinforcement signal for transmission in scan lines within a vertical blanking interval of a predetermined television video signal, the method including the steps of:

randomizing the reinforcement signal in accordance with a predetermined key, adding the randomized signal to be within the vertical blanking interval of the video signal to produce a combined signal, and sending the combined signal through a television transmission path.

2. The generation method set forth in claim 1 wherein the step of randomizing comprises the steps of:
   generating a pseudo-random encode switching pattern for each scan line carrying the reinforcement signal, the pattern switching between plus unity and minus unity over a duration selected to minimize sub-aliases within a frequency band of the video signal and of the reinforcement signal,
   inverting the switching pattern on a basis integrally related to field rate and frame rate,
   multiplying the reinforcement signal by the inverting switching pattern to provide a resultant product, and wherein the step of adding the randomized signal to be within the vertical blanking interval comprises the step of adding the resultant product to be within the vertical blanking interval of the video signal to produce the combined signal.

3. The generation method set forth in claim 1 wherein the step of randomizing comprises the step of shuffling scan lines containing the reinforcement signal in accordance with a predetermined shuffling key to produce a shuffled reinforcement signal.

4. The generation method set forth in claim 3 wherein the randomizing step further includes the step of inverting the shuffled reinforcement signal on a basis integrally related to field rate and frame rate.

5. The generation method set forth in claim 3 wherein the shuffling key is dynamically generated and is added to the combined signal.

6. The generation method set forth in claim 1 wherein the video signal is in accordance with an aspect ratio which is greater than four to three, whereby the combined signal may be displayed on a conventional television display which displays visible portions of an extended vertical blanking interval as horizontal bands at the top and bottom of the conventional television display's picture and wherein the reinforcement signal within the bands is not coherent with any picture image being displayed.

7. The generation method set forth in claim 6 wherein the aspect ratio of the video signal is approximately 1.61.

8. The generation method set forth in claim 6 wherein the aspect ratio of the video signal is approximately 1.77.

9. The generation method set forth in claim 1 wherein the reinforcement signal is a luminance component preemphasis signal lying substantially in a frequency range between zero and 2 MHz.

10. The generation method set forth in claim 1 wherein the reinforcement signal is a bandwidth expansion signal for expanding the bandwidth of a luminance component of the video signal in a high frequencies spectral area thereof.

11. The generation method set forth in claim 10 wherein the high frequencies spectral area comprises a baseband spectral region lying in a range substantially between 4 MHz and 7 MHz.

12. The generation method set forth in claim 1 wherein the reinforcement signal is a motion signal indicative of the presence and position of motion activity within the video signal.

13. The generation method set forth in claim 1 comprising the further step of compressing the reinforcement signal in at least one of the time and space domains of the video signal, so that the reinforcement signal may be carried on scan lines otherwise lying within the vertical interval of the video signal.

14. The generation method set forth in claim 1 wherein the reinforcement signal has an amplitude lying in a range of minus ten IRE units and plus thirty IRE units.

15. The generation method set forth in claim 1 further comprising the step of gamma correcting the reinforcement signal before it is added to the vertical interval.

16. The generation method set forth in claim 1 wherein the step of randomizing the reinforcement signal includes the step of inverting scan lines carrying the reinforcement signal from field to field in successive fields of the television video signal.

17. The generation method set forth in claim 2 wherein the pseudo-random switching pattern is identical for a said line within a group of lines of the blanking interval and is different from line to line.

18. A method for enhancing display of a television picture with a reinforcement signal separated from a combined signal received through a television transmission path, the combined signal being prepared at a transmission location of the path by the steps of: randomizing the reinforcement signal in accordance with a predetermined key, and adding the randomized signal to be within the vertical blanking interval of the video signal to produce a combined signal, the separation method comprising the steps of:
   separating the randomized reinforcement signal and the video signal from the combined signal in accordance with vertical interval information extracted by a sync separator,
   derandomizing the randomized reinforcement signal in accordance with an inverse of the predetermined key to produce a decoded reinforcement signal, and
   combining the decoded reinforcement signal in proper phase relationship with the separated video signal in order to provide a performance enhanced video display signal.

19. The enhancement method set forth in claim 18 wherein the separated video signal is in accordance with an aspect ratio which is greater than four to three, whereby the combined signal may be displayed on a conventional television display which displays an increased vertical blanking interval as horizontal bars at the top and bottom of the television picture and wherein the randomized reinforcement signal within the bars is not visually coherent with any picture image being displayed.

20. The enhancement method set forth in claim 18 wherein the aspect ratio of the separated video signal is approximately 1.61.

21. The enhancement method set forth in claim 18 wherein the aspect ratio of the separated video signal is approximately 1.77.

22. The enhancement method set forth in claim 18 wherein the reinforcement signal is a luminance component preemphasis signal lying substantially in a frequency range between zero and 2 MHz.

23. The enhancement method set forth in claim 18 wherein the reinforcement signal is a bandwidth expansion signal for expanding the bandwidth of a luminance component of the video signal lying in a high frequencies spectral area thereof.

24. The enhancement method set forth in claim 23 wherein the high frequencies spectral area comprises a baseband spectral region lying in a range substantially between 4 MHz and 7 MHz.

25. The enhancement method set forth in claim 18 wherein the reinforcement signal is a signal indicative of presence and position of motion within the video signal.

26. The enhancement method set forth in claim 18 wherein the reinforcement signal has been compressed in at least one of the time and space domains of the video signal, for transmission on scan lines otherwise lying within the vertical interval of the video signal.

27. The enhancement method set forth in claim 18 wherein the reinforcement signal has an amplitude lying in a range of minus ten IRE units and plus thirty IRE units.

28. The enhancement method set forth in claim 18 wherein the reinforcement signal has been gamma corrected prior to insertion in the vertical interval and comprising the further step of inverse gamma correcting the resultant decode product before it is added to the separated video signal.

29. The enhancement method set forth in claim 18 wherein the reinforcement signal has been randomized by the steps of generating a pseudo-random encode switching pattern for each scan line carrying the reinforcement signal and the switching pattern has been inverted from field to field of successive fields of the television video signal, and wherein the derandomizing step comprises the steps of:
generating a pseudo-random decode switching signal which reproduces the pseudo-random encode switching signal,
inverting the pseudo-random decode switching signal on a field to field basis, and
multiplying the separated reinforcement signal by the inverting pseudo-random decode switching signal to provide a resultant decoded reinforcement signal.

30. The enhancement method set forth in claim 29 wherein the pseudo-random encode and decode switching patterns are identical for a said line within a group of lines of the blanking interval and are different from line to line.

31. The enhancement method set forth in claim 18 wherein the randomizing step has been carried out at a transmission location of the path by the steps of: shuffling scan lines containing the reinforcement signal in accordance with a predetermined shuffling key to produce a shuffled reinforcement signal, and inverting the shuffled reinforcement signal on a basis integrally related to field rate and frame rate; and wherein the derandomizing step comprises the steps of:
reinverting the shuffled reinforcement signal on the same basis integrally related to field rate and frame rate as was perfurned at the transmission location and
deshuffling the reinverted reinforcement signal in accordance with an inverse of the predetermined shuffling key to provide the decoded reinforcement signal.

32. The enhancement method set forth in claim 3 wherein the predetermined shuffling key has been determined dynamically at the transmission location and has been added to the combined signal and comprising the further steps of:
separating the shuffling key from the combined signal and generating an inverse of the shuffling key for controlling deshuffling of the reinverted reinforcement signal.

* * * * *

UNITED STATES PATENT AND TRADEMARK OFFICE
CERTIFICATE OF CORRECTION

PATENT NO. : 4,959,717
DATED : September 25, 1990
INVENTOR(S) : Yves C. Faroudja It is certified that error appears in the above-identified patent and that said Letters Patent is hereby corrected as shown below:

In Claim 31, Column 18, line 19 of the Patent, change "perfurned" to --performed--.

In Claim 32, Column 18, line 25 of the Patent, change "3" to --31--.

Signed and Sealed this

Fourteenth Day of January, 1992

*Attest:*

HARRY F. MANBECK, JR.

*Attesting Officer*  *Commissioner of Patents and Trademarks*